(12) United States Patent
Oelsch

(10) Patent No.: US 6,939,048 B2
(45) Date of Patent: Sep. 6, 2005

(54) HYDRODYNAMIC THRUST BEARING

(75) Inventor: Juergen Oelsch, Hohenroth (DE)

(73) Assignee: Minebea Co., Ltd (JP)

(*) Notice: Subject to any disclaimer, the term of this patent is extended or adjusted under 35 U.S.C. 154(b) by 133 days.

(21) Appl. No.: 10/620,647

(22) Filed: Jul. 16, 2003

(65) Prior Publication Data

US 2005/0025404 A1 Feb. 3, 2005

(30) Foreign Application Priority Data

Jul. 24, 2002 (DE) .................................. 202 11 203 U

(51) Int. Cl.[7] .......................... F16C 32/06; B21D 53/10
(52) U.S. Cl. ................... 384/107; 29/898.02; 384/121
(58) Field of Search .............................. 384/100, 107, 384/114, 115, 121; 29/898.02

(56) References Cited

U.S. PATENT DOCUMENTS

| 4,082,293 | A | * | 4/1978 | Schouwenaars | ............. | 369/269 |
| 5,357,163 | A | | 10/1994 | Minakuchi et al. | | |
| 6,357,916 | B2 | * | 3/2002 | Saeki et al. | ................. | 384/100 |
| 6,361,216 | B1 | * | 3/2002 | Takahashi et al. | .......... | 384/123 |
| 2004/0114840 | A1 | * | 6/2004 | Gomyo | ....................... | 384/107 |

FOREIGN PATENT DOCUMENTS

| DE | 196 37 014 A1 | 9/1996 |
| DE | 196 37 015 A1 | 9/1996 |
| GB | 274954 | 7/1927 |
| JP | 2000-310220 | 11/2000 |
| JP | 2000-324753 A | 11/2000 |
| JP | 2001-132738 A | 5/2001 |

OTHER PUBLICATIONS

German Patent Office Search Report.

* cited by examiner

*Primary Examiner*—Thomas R. Hannon
(74) *Attorney, Agent, or Firm*—Schulte Roth & Zabel LLP; Anna Vishev, Esq.

(57) ABSTRACT

A hydrodynamic thrust bearing, forming a part of a bearing system for a rotary bearing of spindle motors utilized to power hard disk drives, which includes at least one annular thrust plate and a counter bearing corresponding to the thrust plate. The thrust plate is firmly connected to a shaft rotatably supported by a radial bearing system. The shaft features an axial bore extends from one shaft end located outside the bearing system until the area where the thrust plate is to be positioned. A fixing element is inserted into the axial bore, an outer diameter of the fixing element being greater than the smallest inner diameter of the bore. This enables the thrust plate to be easily mounted in a press fit even in the area around the middle of the shaft.

9 Claims, 4 Drawing Sheets

HYDRODYNAMIC THRUST BEARING

CROSS REFERENCE TO RELATED APPLICATION

This application claims all rights of priority to German Patent Application No. DE 202 11 203.9, filed on Jul. 24, 2002 (pending).

FIELD OF THE INVENTION

The invention relates to a hydrodynamic thrust bearing, particularly forming a part of a hydrodynamic bearing system for a rotary bearing of spindle motors utilized to power hard disk drives.

BACKGROUND OF THE INVENTION

A hydrodynamic bearing system essentially includes a bearing sleeve, a shaft accommodated in an inner cylindrical bore of the bearing sleeve and at least one radial bearing section provided between the bearing sleeve and the shaft with the aid of which the shaft and the bearing sleeve are supported rotatably with respect to each other. A bearing gap formed between the shaft and the bearing sleeve is filled with a liquid lubricant, preferably bearing oil.

A hydrodynamic bearing system is also provided with a hydrodynamic thrust bearing to take on axial loads. Such thrust bearing is essentially formed by a thrust plate preferably arranged at one end of the shaft and a corresponding cover plate. The cover plate forms the counter bearing to the thrust plate and seals the entire bearing system from below so that no lubricant can escape from the bearing system.

In the bearing arrangement described above, the thrust plate of the thrust bearing is located at one end of the shaft. The radial and thrust bearings are thus arranged one after the other along the rotational axis. The disadvantage of this type of arrangement is that the stability of the bearing is negatively influenced, particularly the vibration behavior of the rotor determined by the radial bearing's resistance to tilt.

It is therefore known to arrange the thrust plate about half way along the shaft, wherein an advantage of this arrangement is found in the fact that the span, i.e. the axial extension of the bearing arrangement, is increased. This improves the vibration behavior of the bearing and produces greater running stability, without having to accept increased friction losses as in the bearing arrangement mentioned at the beginning. A disadvantage of this arrangement is that due to the press fit provided between the shaft and the thrust plate, it is very difficult to push the thrust plate to the middle of the shaft. In doing so, there is a risk that the thrust plate adheres to the shaft due to local cold welding with the result that both the thrust plate and the shaft are rendered unusable.

To avoid these problems, it is known to connect the thrust plate to the shaft by means of welding. This type of bonding is revealed in JP 2000-324753. There is, however, the disadvantage and risk that the bearing system could become contaminated through welding residue which can cause damage to the bearing system. Due to the heat created in the welding process, there is an added risk that the thrust plate could be deformed and thus rendered unusable.

Another possible solution is to form the thrust plate and the shaft as one piece. Manufacturing such an integral component with the required tolerances, however, involves a very complex and expensive process.

SUMMARY OF THE INVENTION

The object of the invention is thus to provide a hydrodynamic thrust bearing which enables the thrust plate to be more easily mounted, particularly in the area around the middle of the shaft.

The invention is distinguished by the fact that the shaft features an axial bore which extends from one end of the shaft located outside the bearing system to at least the area where the thrust plate is to be positioned. An element used to fix the thrust plate into its position can be inserted into the provided axial bore. An outer diameter of the fixing element is greater than the smallest inner diameter of the bore.

Commensurate with the designated fit between the thrust plate and the shaft, no force or very little force is required to mount the thrust plate. This means that in the process of attaching the thrust plate no distortion is caused and the thrust plate does not adhere to the shaft. This advantage is particularly noticeable when the thrust plate is arranged half way along the shaft. In accordance with the invention, the thrust plate can now be pushed up to its intended position on the shaft relatively easily and without being damaged, and only then be firmly fixed by the insertion of the fixing element.

Pressing the fixing element into the shaft, causes the shaft to expand in the area of the thrust plate, whereby radial pressure is created which fixes the thrust plate to the shaft. The press-out force between the shaft and the thrust plate made possible by the invention is at least as great or greater than the press-out force achieved through a conventional press connection According to the invention, the bore is cut from the end of the shaft that is located outside the bearing system. Therefore, if compressed air trapped in the bore should ever escape from the bore when the fixing element is inserted, the air will never leak into the bearing system. Air in the bearing gap would mean that a uniform lubricant film could no longer be ensured which would result in the bearing being destroyed.

Another advantage of the invention as compared to the prior art is that even when a very thin thrust plate, relative to the diameter of the shaft is used, a high press-out force and adequate perpendicularity of the thrust plate with respect to the shaft is achieved There is a further benefit in the fact that when the thrust plate is mounted and fixed onto the shaft in accordance with the invention, there is no risk that contact surfaces of the bearing system will become contaminated by filings or suchlike.

The fixing element should preferably take the form of a sphere. However, it can also be cylindrical, barrel-shaped or have a truncated conical shape. Particularly suitable materials include steel, ceramic or brass.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
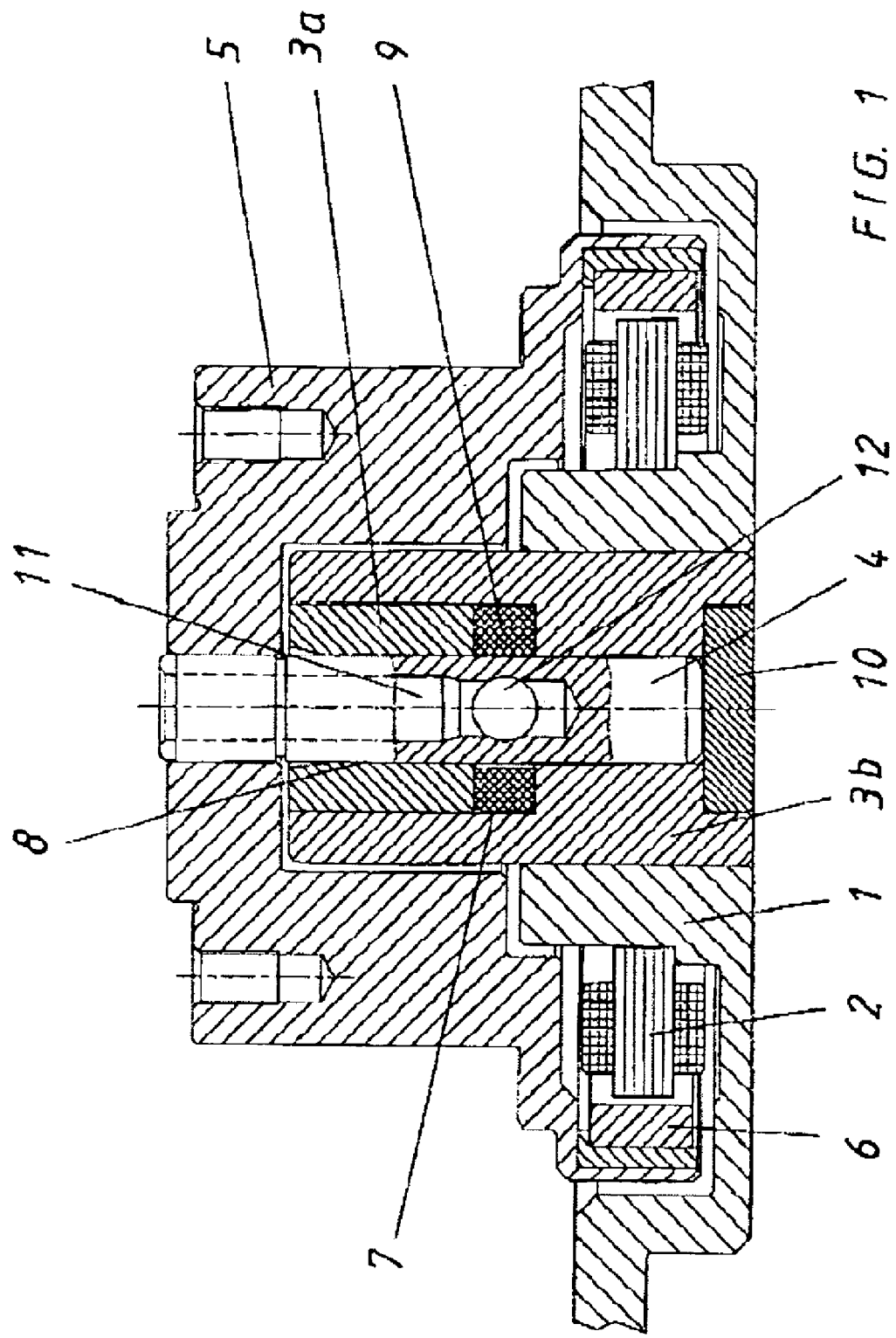
FIG. 1 shows a cross-sectional view of a spindle motor to power a hard disk drive incorporating a first embodiment of the thrust plate according to the invention.

As shown in FIG. 1, a spindle motor to power a hard disk drive having a hydrodynamic bearing system is provided in accordance with the invention. In the embodiments illustrated, a shaft carrying a rotor is rotatably supported in a stationary bearing sleeve. As would be understood by a person skilled in the art, the invention also includes designs in which a stationary shaft is enclosed by a rotatable bearing sleeve supporting the rotor.

The spindle motor includes stationary baseplate 1 on which stator arrangement 2, consisting of a stator stack and windings, is accommodated. Bearing sleeve 3 is firmly set in a recess of baseplate 1. For assembly purposes, bearing sleeve 3 is formed as a two-part element and consists of upper part 3a and lower part 3b. Parts 3a and 3b of the bearing sleeve together form an axial cylindrical bore in which shaft 4 is rotatably accommodated. The free end of shaft 4 supports hub 5 on which one or more storage disks (not illustrated) of the hard disk drive can be arranged and mounted. Located at an inner, lower edge of the hub 5 is annular permanent magnet 6 having a plurality of pole pairs which are affected by an alternating electrical field generated by stator arrangement 2 separated from them by an air gap so that rotor 5 is set into rotation together with shaft 4. Bearing gap 8 is formed between an inner diameter of bearing sleeve 3 and an outer diameter of shaft 4. The bearing gap is filled with a lubricant.

Figure 2:
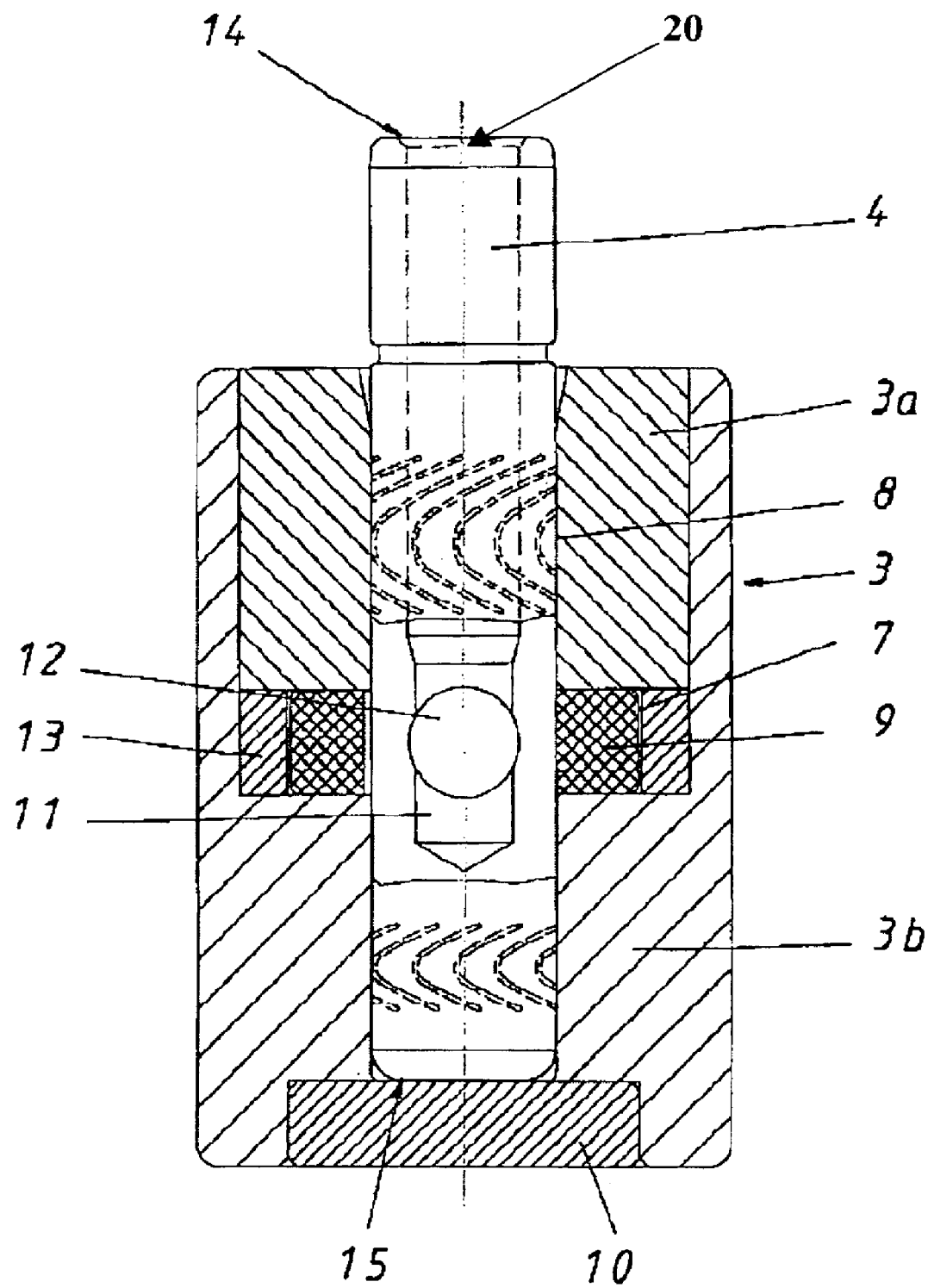
FIG. 2 shows an enlarged view of the thrust bearing shown in FIG. 1.

The enlarged view of the hydrodynamic bearing arrangement is shown in FIG. 2. The bearing arrangement is formed by two radial bearing sections, illustrated schematically by a groove pattern which is provided on the outer surface of shaft 4 and/or on the inner surface of bearing sleeve 3. As soon as rotor 5, and thus shaft 4, is set in rotation, hydrodynamic pressure is built up in the lubricant within bearing gap 8 generating the load-bearing capacity of the bearing.

Thrust plate 9 is fixedly mounted to shaft 4 in the area of recess 7 formed by bearing sleeve parts 3a and 3b and spacer 13, where applicable. When thrust plate 9 rotates, it forms a hydrodynamic thrust bearing to take on the axial load of the bearing arrangement. Cover plate 10 seals the entire bearing arrangement from below so that no lubricant can escape from bearing gap 8. The cover plate is accommodated in an appropriate recess in bearing sleeve part 3b. Thrust plate 9, the bottom surface of bearing sleeve part 3a and/or the top surface of bearing sleeve part 3b may be provided with a pressure generating groove pattern (not shown).

According to the invention, thrust plate 9 can be arranged on shaft 4 in a sliding fit, a transition fit or by means of a press fit, i.e. the inner diameter of the central bore in thrust plate 9 can be slightly larger, the same size or smaller than the outer diameter of the shaft.

Shaft 4 is provided with axial bore 11 extending from end 14 of the shaft located outside the bearing system until the area where thrust plate 9 is to be positioned. Bore 11 can be formed as an extension to a tapped bore for mounting hub 5. The diameter of such bore becomes narrower, and in the area where thrust plate 9 is to be positioned, it preferably corresponds to half the thickness of thrust plate 9. To fix thrust plate 9 to shaft 4, fixing element 12 in the form of a sphere is pressed into bore 11 of the shaft. The outer diameter of sphere 12 is preferably larger than the smallest inner diameter of the bore, so that when the sphere is inserted, the shaft expands in this area and creates a radial fit which permanently attaches the thrust plate to the shaft. The larger bore 11 with respect to the diameter of shaft 4 and the greater the excess size of sphere 12 compared to the smallest diameter of the bore, the greater the shaft expansion caused by the insertion of sphere 12 and the greater the achievable press-out force.

Before sphere 12 is pressed into bore 11, thrust plate 9 is set on the shaft perpendicular to its rotational axis 20. A high-precision mounting device may be used for this purpose.

Figure 3:
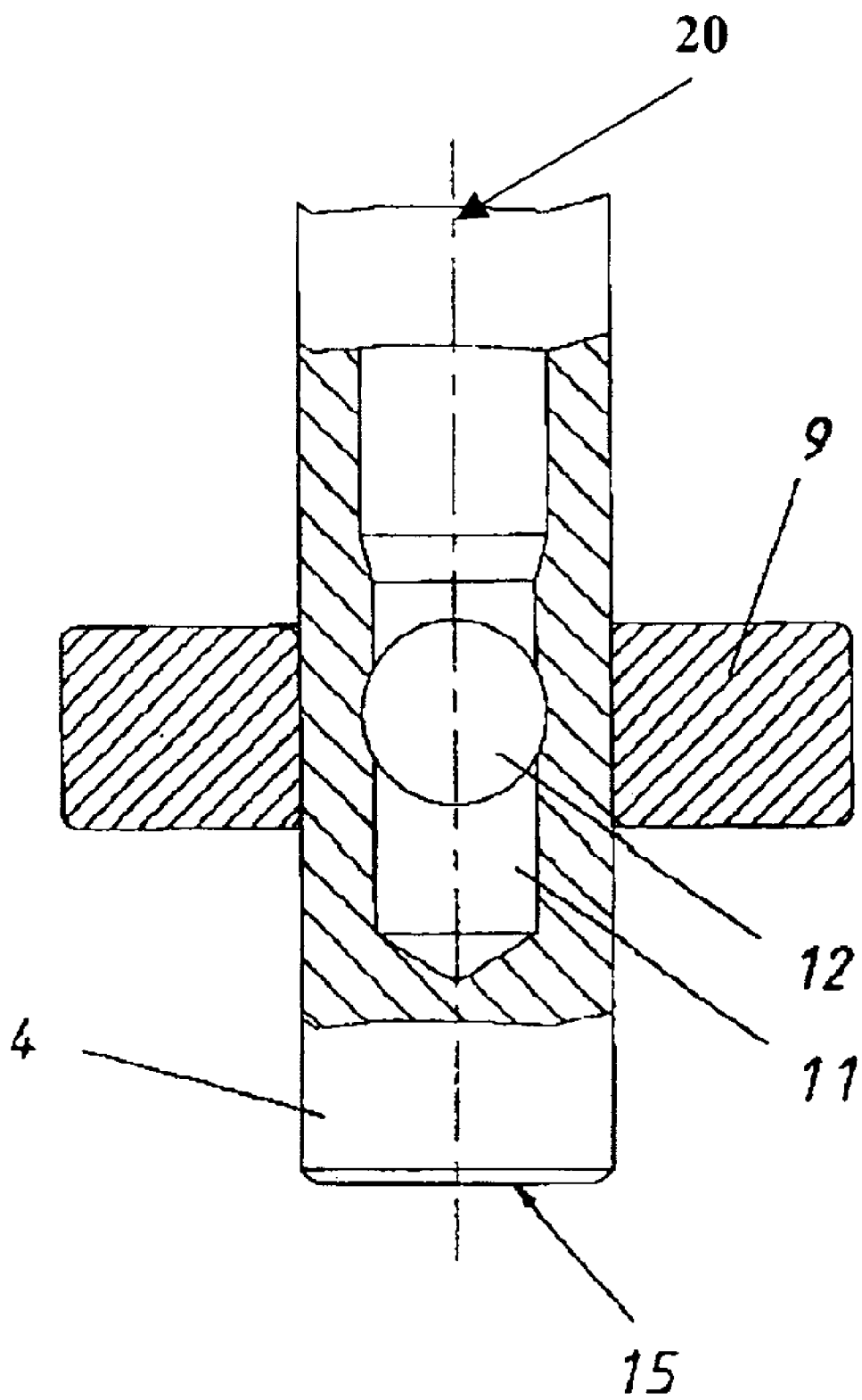
FIG. 3 shows an enlarged view of the shaft with a thrust bearing mounted approximately midway.

Thrust plate 9 which is arranged towards the middle of shaft 4 is shown in FIG. 3. To mount thrust plate 9 to shaft 4, axial bore 11 is first formed inside the shaft. Thrust plate 9 is then slid onto or pressed onto shaft 4 and set in the desired position at a precise right angle to rotational axis 20 of shaft 4. Finally, fixing element 12 is pressed into bore 11 of shaft 4 that causes the diameter of the shaft to expand in the desired area and thus to firmly fix thrust plate 9. It is important that end 15 of shaft 4 located within the bearing system is sealed so that any air trapped in bore 11 could not escape into bearing gap 8.

Figure 4:
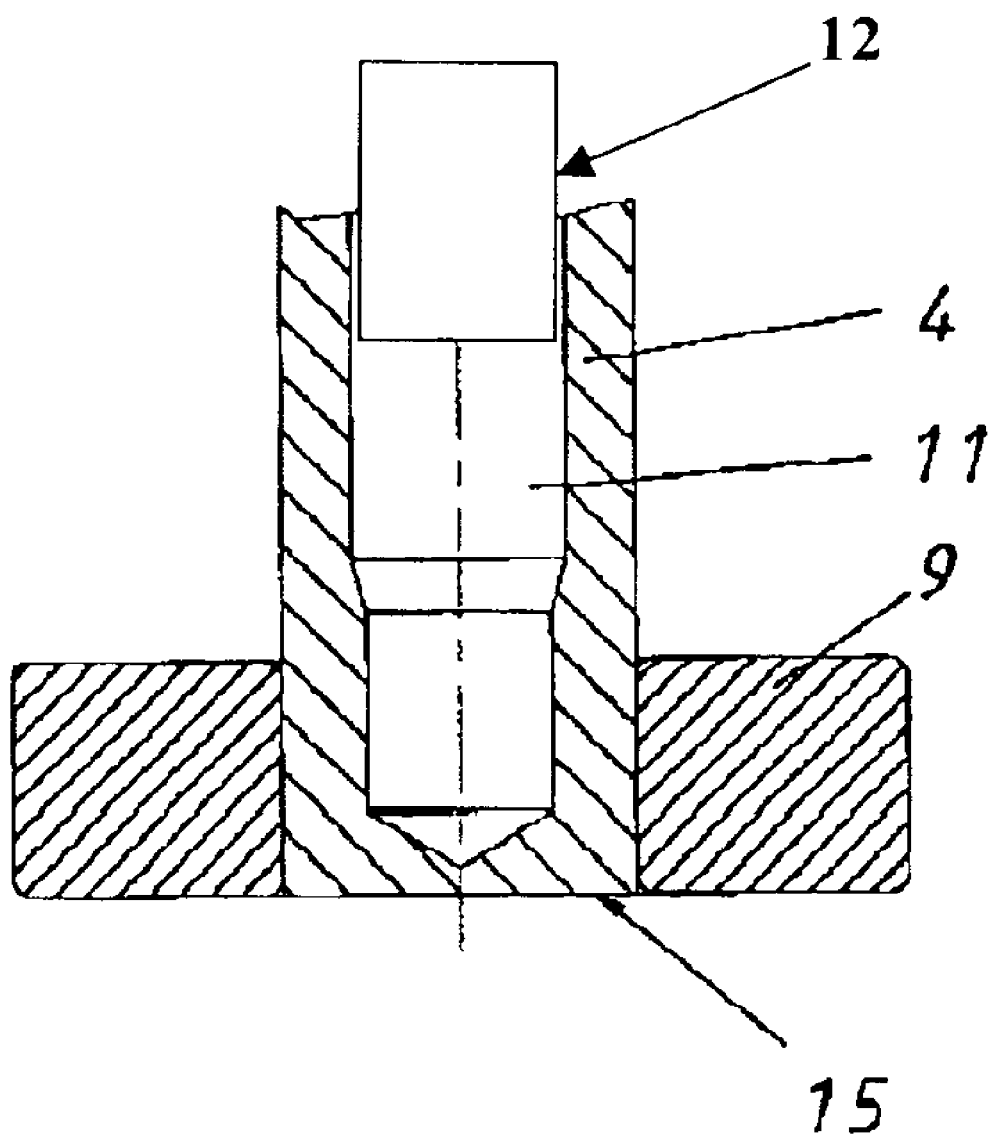
FIG. 4 shows an enlarged view of the shaft with a thrust bearing mounted at the end.

FIG. 4 shows an embodiment of the invention in which thrust plate 9 is arranged at one end 15 of shaft 4. Bore 11 is formed from the other end of the shaft, located outside the bearing system, and ends at a position corresponding to the intended position for thrust plate 9. The fixing element 12 is shown as cylindrical plug to be inserted into bore 11. Here again, end 15 of the shaft located within the bearing system is sealed.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A hydrodynamic bearing system, comprising:
   a shaft, said shaft further comprising an axial bore;
   a radial bearing portion radially supporting said shaft;
   at least one annular thrust plate fixedly mounted on said shaft; and
   a counter bearing corresponding to said thrust plate,
   wherein said axial bore extends from one shaft's end located outside said bearing system until a position corresponding to a desired position for said thrust plate, wherein a fixing element is inserted into said axial bore to fix said thrust plate to said shaft, and wherein an outer diameter of said fixing element is greater than a smallest inner diameter of said axial bore.

2. The hydrodynamic bearing system according to claim 1, wherein said fixing element is a sphere.

3. The hydrodynamic bearing system according to claim 1, wherein said fixing element is a cylindrical plug.

4. The hydrodynamic bearing system according to claim 1, wherein a peripheral surface of said fixing element is rounded in form.

5. The hydrodynamic bearing system according to claim 1, wherein a second end of said shaft is located within said bearing system and is tightly sealed therein.

6. The hydrodynamic bearing system according to claim 1, wherein said thrust plate is attached in a sliding fit, a transition fit or a press fit to said shaft.

7. The hydrodynamic bearing system according to claim 1, wherein said thrust plate is set at a right angle to a rotational axis of said shaft before said fixing element is inserted.

8. The hydrodynamic bearing system according to claim 1, wherein an inner diameter of said axial bore is equal to half the thickness of said thrust plate.

9. A method of manufacturing of a hydrodynamic bearing system, comprising the steps of:
    forming an axial bore inside a shaft;
    arranging a thrust plate into a desired position on said shaft at a precise right angle to a rotational axis of said shaft; and
    pressing a fixing element into said axial bore of said shaft such that the diameter of said shaft expands in said desired position firmly fixing said thrust plate to said shaft,
    wherein said axial bore extends from one shaft's end located outside said bearing system until a position corresponding to said desired position for said thrust plate.

* * * * *